United States Patent
Evans et al.

[11] Patent Number: 6,076,727
[45] Date of Patent: *Jun. 20, 2000

[54] HEAT EXCHANGER AND METHOD OF ASSEMBLY FOR AUTOMOTIVE VEHICLES

[75] Inventors: Tim Van Evans, Ypsilanti; Matthew John Zaluzec, Canton; Gerald Adam Grab, Trenton; Henry Mehraban, Northville; Ronald Paul Cooper, Eastpointe; Walter Leon Winterbottom, Farmington Hills, all of Mich.

[73] Assignee: Ford Motor Company, Dearborn, Mich.

[*] Notice: This patent is subject to a terminal disclaimer.

[21] Appl. No.: 09/077,000

[22] Filed: May 13, 1998

Related U.S. Application Data

[62] Division of application No. 08/627,870, Apr. 3, 1996, Pat. No. 5,762,132.

[51] Int. Cl.[7] .............................. B23K 31/02; B23K 1/20; B23K 35/34; B23P 15/26; F28F 13/18

[52] U.S. Cl. ..................... 228/183; 228/118; 228/203; 228/208; 228/219; 228/223; 29/890.054; 148/23; 165/133; 165/134.1; 165/152

[58] Field of Search ................... 165/134.1, 133, 165/152; 228/183, 223, 219, 118, 208, 203; 29/890.054; 148/23

[56] References Cited

U.S. PATENT DOCUMENTS

| | | | |
|---|---|---|---|
| 3,370,343 | 2/1968 | Martin | 228/206 |
| 3,378,914 | 4/1968 | Miller | 228/193 |
| 3,737,483 | 6/1973 | Miller | 228/221 |
| 3,973,718 | 8/1976 | Deschamps | 228/183 |
| 4,173,302 | 11/1979 | Schultze et al. | 228/219 |
| 4,240,574 | 12/1980 | Schmatz et al. | 228/217 |
| 4,357,397 | 11/1982 | Baba et al. | 428/654 |
| 4,401,254 | 8/1983 | Tramontini | 228/217 |
| 4,466,567 | 8/1984 | Garrison | 228/183 |
| 4,626,295 | 12/1986 | Sasaki et al. | 148/127 |
| 4,721,653 | 1/1988 | Oda et al. | 428/472.2 |
| 4,758,273 | 7/1988 | Gilman et al. | 75/249 |
| 4,785,092 | 11/1988 | Nanba et al. | 420/540 |
| 5,069,980 | 12/1991 | Namba et al. | 428/654 |
| 5,125,452 | 6/1992 | Yamauchi et al. | 165/133 |
| 5,148,862 | 9/1992 | Hashiura et al. | 165/134.1 |
| 5,171,377 | 12/1992 | Shimizu et al. | 148/23 |
| 5,180,098 | 1/1993 | Halstead et al. | 228/183 |
| 5,232,521 | 8/1993 | Takahashi et al. | 148/26 |
| 5,350,436 | 9/1994 | Takezoe et al. | 75/314 |
| 5,422,191 | 6/1995 | Childree | 428/654 |
| 5,423,122 | 6/1995 | Boltz et al. | 29/890.054 |

*Primary Examiner*—Patrick Ryan
*Assistant Examiner*—Zidia J. Pittman
*Attorney, Agent, or Firm*—Raymond L. Coppiellie

[57] ABSTRACT

A heat exchanger assembly includes at least one tube having an internal surface and an external surface, a composition cladding having at least lithium and magnesium applied to either one of the internal surface and external surface of the tube, and at least one component disposed adjacent the composition cladding, whereby the tube and component are joined together during a controlled atmosphere brazing process.

10 Claims, 2 Drawing Sheets

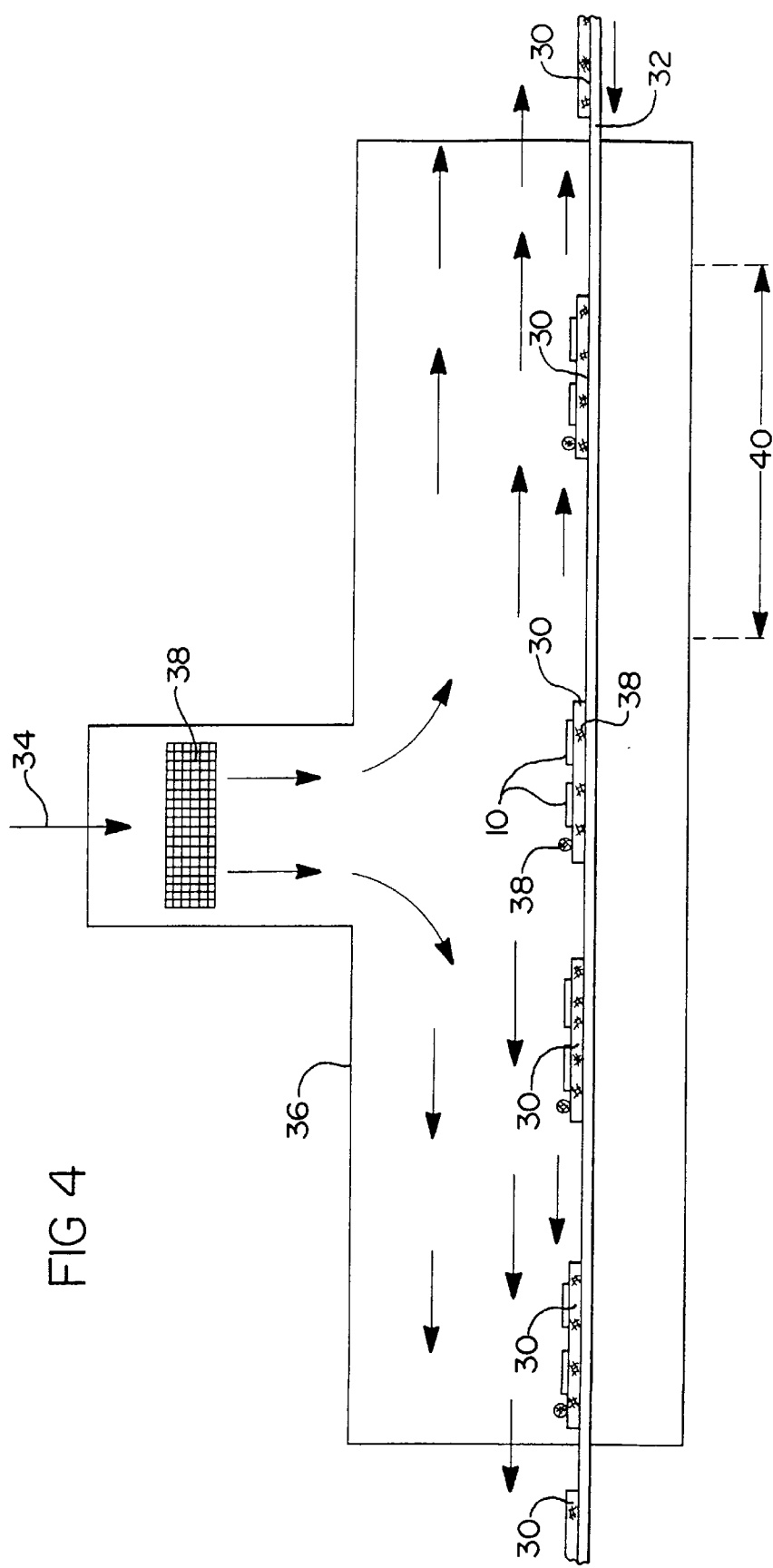

HEAT EXCHANGER AND METHOD OF ASSEMBLY FOR AUTOMOTIVE VEHICLES

CROSS-REFERENCE TO RELATED APPLICATION(S)

The present application is a division of application Ser. No. 08/627,870, filed Apr. 3, 1996, now U.S. Pat. No. 5,762,132.

BACKGROUND OF THE INVENTION

1. Field of the Invention

The present invention relates generally to heat exchangers and, more specifically, to a heat exchanger and method of assembly for an automotive vehicle.

2. Description of the Related Art

It is known to provide automotive vehicles with heat exchangers such as condensers, evaporators, heater cores and coolers. These heat exchangers are alternating rows of tubes or plates with convoluted fins made of a metal material such as aluminum or an aluminum alloy. Many of these heat exchangers have turbulators disposed within the tubes that require internal brazing. Previously, the tubes and turbulators have been brazed in a vacuum furnace. Recently, a process known as "controlled atmosphere (CAB)" furnace brazing has been used with non-corrosive fluxes. CAB furnace brazing has been preferred over vacuum furnace brazing due to improved production yields, lower furnace maintenance requirements and greater braze process robustness.

It is also known that the CAB furnace brazing currently used to manufacture aluminum heat exchangers requires the use of fluxing agents, either chloride based or fluoride based. The use of these fluxing agents with conventional aluminum heat exchangers promotes the dissociation and disruption of the native aluminum oxide and magnesium oxide layers present on the surface of the aluminum heat exchanger to promote wetting of the molten clad layer between mating components.

It is further known for CAB furnace brazing that an inert gas such as nitrogen gas is used to provide a non-oxidizing atmosphere. Although considered to be non-oxidizing, nitrogen gas contains residual impurities, most notably oxygen and water vapor. Although the aluminum heat exchanger is pre-cleaned using alkaline cleaning agents which reduce the native aluminum oxide layer, the surface of the aluminum heat exchanger will re-oxidize in the CAB furnace due to the presence of the oxygen and water vapor in the nitrogen gas. To minimize reoxidation of the aluminum heat exchanger during the brazing process, the oxygen and water vapor in the nitrogen gas may be purified to less than twenty parts per million (20 ppm).

Although CAB furnace brazing has worked well, it suffers from the disadvantage that the internal tube surfaces and the turbulator of the heat exchanger require individual fluxing before assembly and an overall fluxing of the completed assembly before brazing. Also, CAB furnace brazing suffers from the disadvantage that the individual fluxing of the components of the heat exchanger is costly and time consuming. Further, CAB furnace brazing suffers from the disadvantage that purified inert gas is not cost effective for use in high volume processing of aluminum heat exchangers.

SUMMARY OF THE INVENTION

Accordingly, the present invention is a heat exchanger assembly for an automotive vehicle including at least one tube having an internal surface and an external surface, a composition cladding having at least lithium and magnesium applied to either the internal surface or external surface of the tube, and at least one component disposed adjacent the composition cladding, whereby the at least one tube and the at least one component are joined together during a controlled atmosphere brazing process.

Additionally, the present invention is a method of assembly of a heat exchanger for an automotive vehicle including the steps of providing at least one tube having an internal surface and an external surface. The method includes the steps of applying a composition cladding having at least lithium and magnesium to either one or both the internal surface or external surface. The method further includes the steps of disposing at least one component adjacent the composition cladding and joining the tube and component together using a controlled atmosphere brazing process.

One advantage of the present invention is that a heat exchanger assembly is provided for an automotive vehicle that has a composition cladding having at least elemental lithium and magnesium that allows for fluxless internal brazing of the heat exchanger components without the application of a fluxing agent to promote oxide layer breakdown. Another advantage of the present invention is that the heat exchanger assembly eliminates the use of flux and is less expensive and less time consuming to manufacture. Yet another advantage of the present invention is that a method of assembly of the heat exchanger is provided which eliminates flux residues that can block internal tube passages. Still another advantage of the present invention is that the heat exchanger assembly may have the addition of elemental Cesium (Cs) in the composition cladding to effectively promote aluminum and magnesium oxide dissociation and increased braze joint quality in a CAB furnace brazing process. A further advantage of the present invention is that the addition of elemental Cesium in the composition cladding allows for higher levels of Magnesium (Mg) in the core materials, thus providing stronger and more durable components. Yet a further advantage of the present invention is that the method uses an active metal getter source to remove residual gas impurities, namely oxygen and water vapor from inert gases to levels below 20 ppm for fluxless CAB furnace brazing of the aluminum heat exchanger assembly. Still a further advantage of the present invention is that the use of the active metal getter source allows fluxless CAB furnace brazing of evaporators, condensers, heater cores and radiators.

Other features and advantages of the present invention will be readily appreciated as the same becomes better understood after reading the subsequent description taken in conjunction with the accompanying drawings.

BRIEF DESCRIPTION OF THE DRAWINGS

FIG. 4 is a schematic view of a method, according to the present invention, of assembly of the heat exchanger assembly of FIG. 1.

DESCRIPTION OF THE PREFERRED EMBODIMENT(S)

Figure 1:
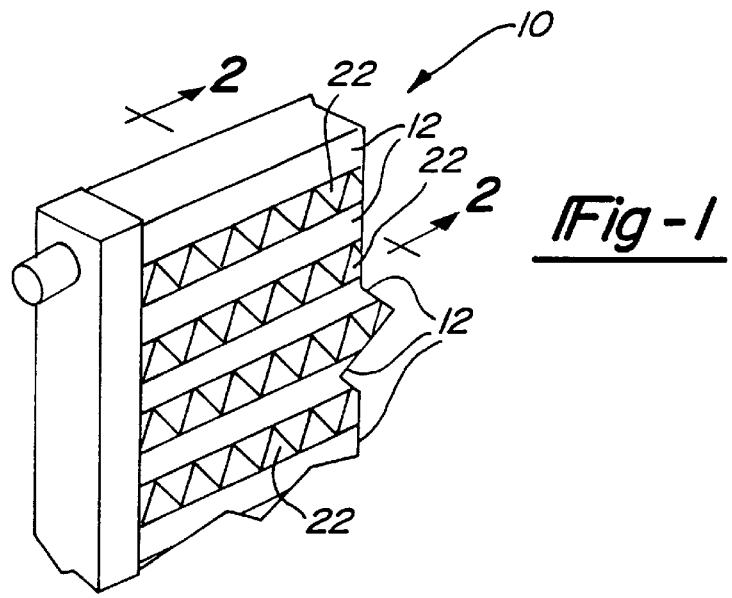
FIG. 1 is a partial perspective view of a heat exchanger assembly according to the present invention.

Referring to FIG. 1, one embodiment of a heat exchanger assembly 10, according to the present invention, is shown.

In this example, the heat exchanger assembly 10 is a condenser for an air conditioning system (not shown) of a vehicle such as an automotive vehicle (not shown). It should be appreciated that the heat exchanger assembly 10 may be a parallel flow condenser, serpentine evaporator, heater core, or transmission oil cooler.

Figure 2:
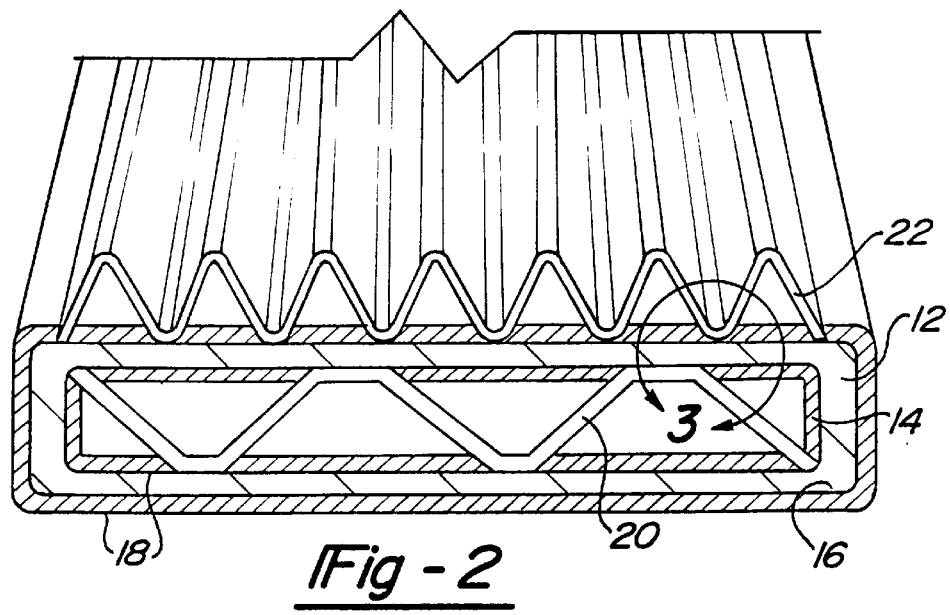
FIG. 2 is a sectional view taken along line 2—2 of FIG. 1.

Referring to FIG. 2, the heat exchanger assembly 10 includes at least one, preferably a plurality of tubes 12. Each tube 12 extends longitudinally and is generally rectangular in shape. Each tube 12 is made of a core material having an internal surface 14 and an external surface 16. The internal surface 14 and external surface 16 each have a composition cladding 18 thereon. The composition cladding 18 contains lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to 13%, manganese (Mn) within a range from about 0% to about 1%, copper (Cu) within a range from about 0.01% to 0.1%, zinc (Zn) within a range from about 0% to about 0.3%, beryllium (Be) within a range from about 0.01% to about 0.7%, impurities not exceeding a total of 1%, balance aluminum. The core material of the tube 12 is made of an aluminum based material selected from the Aluminum Association 1XXX, 3XXX, 5XXX and 6XXX series aluminum alloys. It should be appreciated that the composition cladding 18 is made by rolling aluminum sheets of different alloys which is clad to the surfaces 14 and 16 of the tube 12 by methods well known in the art.

Additionally, the composition cladding 18 may contain cesium (Cs) within a range from about 0% to about 2%. If Cesium is added to the composition cladding 18, the lithium can be within a range from about 0.01% to about 0.5%. The composition cladding 18 can be used with an aluminum braze material containing magnesium within a range from about 0.1% to about 2.0%. It should be appreciated that the addition of elemental Cesium and Lithium promotes aluminum and magnesium oxide dissociation in aluminum braze materials.

Figure 3:
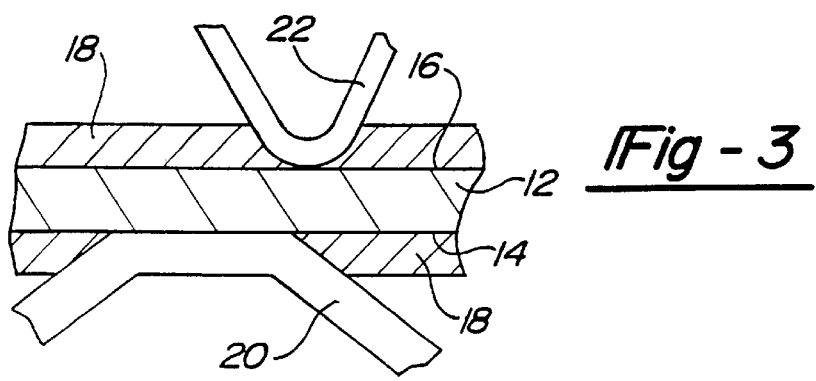
FIG. 3 is an enlarged view of circle 3 in FIG. 2.

Referring to FIGS. 1 through 3, the heat exchanger assembly 10 includes at least one component disposed adjacent the composition cladding 18. For example, the heat exchanger assembly 10 includes a turbulator 20 disposed within the tube 12 adjacent the composition cladding 18 on the internal surface 14. The turbulator 20 extends longitudinally and laterally in a series of undulations. The turbulator 20 breaks up the flow through the tube 12 to effect heat transfer. In another example, the heat exchanger assembly 10 includes a fin 22 disposed adjacent the composition cladding 18 on the external surface 16. The fin 22 extends longitudinally and laterally in a series of undulations. The turbulator 20 and fin 22 are each made of an aluminum based material of the Aluminum Association 3XXX series aluminum alloys.

For assembly of the heat exchanger assembly 10, the turbulator 20 and fin 22 are joined to the tube 12 using a CAB furnace brazing process. During the brazing process, the Cs—Li—Mg content in the composition cladding 18 liquifies at or about 550° C. and flows through a porous aluminum oxide ($Al_2O_3$) layer on the external surface 16 to wet the external surface 16. This wetting provides the medium to continue the dispersement of the oxide layer and allows the composition cladding 18 to flow into a joint therebetween and create a braze. It should be appreciated that the CAB furnace brazing process is conventional and known in the art. It should also be appreciated that plates and manifolds (not shown) may have the composition cladding 18 to allow fluxless brazing for evaporators.

Additionally, a method, according to the present invention, of assembly of the heat exchanger assembly 10 is illustrated in FIG. 4. The method includes the steps of providing at least one tube 12 having an internal surface 14 and an external surface 16 and applying a composition cladding 18 having at least lithium and magnesium to either one of the internal surface 14 or external surface 16. The method includes disposing at least one component 20,22 adjacent the composition cladding 18 and joining the at least one tube 12 and at least one 20,22 component together using a controlled atmosphere brazing (CAB) process.

In the CAB process, the heat exchanger assembly 10 is placed on a braze holding furnace fixture 30 and preheated, for example, to a temperature in a range from about 425° to about 475° F. (224°–246° C.). The heat exchanger assembly 10 and braze holding furnace fixture 30 are transferred to a prebraze chamber where it is soaked for about 3–15 minutes at about 750° F. (399° C.). Subsequently, the hot heat exchanger assembly 10 and braze holding furnace fixture 30 are transferred to a conveyor 32 and moved through a CAB furnace 34 which is purged by applying a nitrogen gas at 34 inside the CAB furnace 36.

The method includes adding an active metal getter source 38 in the CAB furnace 36 to remove residual oxygen and water vapor in the nitrogen gas 34. The active metal getter source 38 may be located upstream of the nitrogen gas, as a solid source 38 affixed to the braze holding furnace fixture 30, or applied as a coating 38 on the braze holding furnace fixture 30 or as a secondary gas purification system (not shown). The active metal getter source 38 may be Titanium, Titanium-alloys, Zirconium and Zirconium alloys. For example, the active metal getter source 38 may be zirconium iron (ZrFe), zirconium nickel (ZrNi) or Titanium Molybdenum (TiMo) used in combination with composition cladding 18 to getter residual oxygen and water vapor from the nitrogen gas to less than twenty parts per million (20 ppm). The Ti getter source is Ti one hundred weight percent (100 wt %) and the TiMo getter source is Ti eighty-five weight percent (85 wt %)/Mo fifteen weight percent (15 wt %). The Zr getter source is Zr one hundred weight percent (100 wt %) and ZrFe getter source is Zr seventy to eighty weight percent (70–80 wt %)/Fe twenty to thirty weight percent (20–30 wt %) and ZrNi getter source is Zr seventy to eighty weight percent (70–80 wt %)/Ni twenty to thirty weight percent (20–30 wt %). The ZrFe, ZrNi and TiMo getter source are most efficient in removing residual water vapor and oxygen in the temperature range from about 400° C. to about 600° C. which is within the temperature range of the CAB furnace. It should be appreciated that the CAB furnace 36 has a hot zone 40 from about 595° C. to about 605° C.

In the CAB furnace 36, the heat exchanger assembly 10 is kept for 2–3 minutes at about 1095°–1130° F. (591°–610° C.). The brazed heat exchanger assembly 10 is then cooled, removed and applied for its intended use.

The subsequent example will further demonstrate the unique composition cladding 18 used with the active metal getter source 38 to fluxless braze the heat exchanger assembly 10 using the CAB process.

EXAMPLE ONE

Fluxless brazing was achieved using an active metal getter source 38 in a nitrogen gas 34 atmosphere between an Al/Si/Li and Al/Mn/Mg composition cladding 18 on a Aluminum Association series aluminum alloy tube 12 and an unclad 3003 aluminum tube in the CAB furnace 36. The composition cladding 18 contained 0.01 to 0.5 wt % Lithium and the core material contained up to 0.5 wt % Magnesium. A standard CAB braze cycle was used to braze test samples in a fluxless CAB process.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for assembly of a heat exchanger for an automotive vehicle, said method comprising the steps of:
   providing at least one tube having an internal surface and an external surface;
   applying a composition cladding having at least lithium and magnesium to either one of the internal surface or external surface;
   disposing at least one component adjacent the composition cladding;
   applying a nitrogen gas during a controlled atmosphere brazing (CAB) process;
   adding an active metal getter source to remove oxygen and water vapor in the nitrogen gas; and
   joining the at least one tube and at least one component together using the CAB process.

2. A method as set forth in claim 1 including the step of locating the active metal getter source upstream of the nitrogen gas.

3. A method as set forth in claim 1 including the step of affixing the active metal getter source to a braze holding furnace fixture for the at least one tube and component.

4. A method as set forth in claim 1 including the step of applying a coating of the active metal getter source on a braze holding furnace fixture for the at least one tube and component.

5. A method as set forth in claim 1 wherein the active metal getter source is selected from the group comprised of Zirconium (Zr), Zirconium Iron (ZrFe), Zirconium Nickel (ZrNi), Titanium (Ti) and Titanium Molybdenum (TiMo).

6. A method as set forth in claim 1 wherein the at least one tube is selected from the Aluminum Association 1XXX, 3XXX, 5XXX and 6XXX series aluminum alloys.

7. A method as set forth in claim 1 wherein the composition cladding comprises lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to 13%, manganese (Mn) within a range from about 0% to about 1%, copper (Cu) within a range from about 0.01% to about 0.1%, zinc (Zn) within a range from about 0% to about 0.3%, beryllium (Be) within a range from about 0.01% to about 0.7%, other impurities not exceeding a total of 1%, balance aluminum.

8. A method as set forth in claim 1 wherein the at least one component comprises a turbulator disposed within the tube adjacent the composition cladding on the internal surface.

9. A method as set forth in claim 1 wherein the at least one component comprises a fin disposed adjacent the composition cladding on the external surface.

10. A method as set forth in claim 1 wherein the at least one component comprises a core material of the Aluminum Association 3XXX series aluminum alloys.

* * * * *